UNITED STATES PATENT OFFICE.

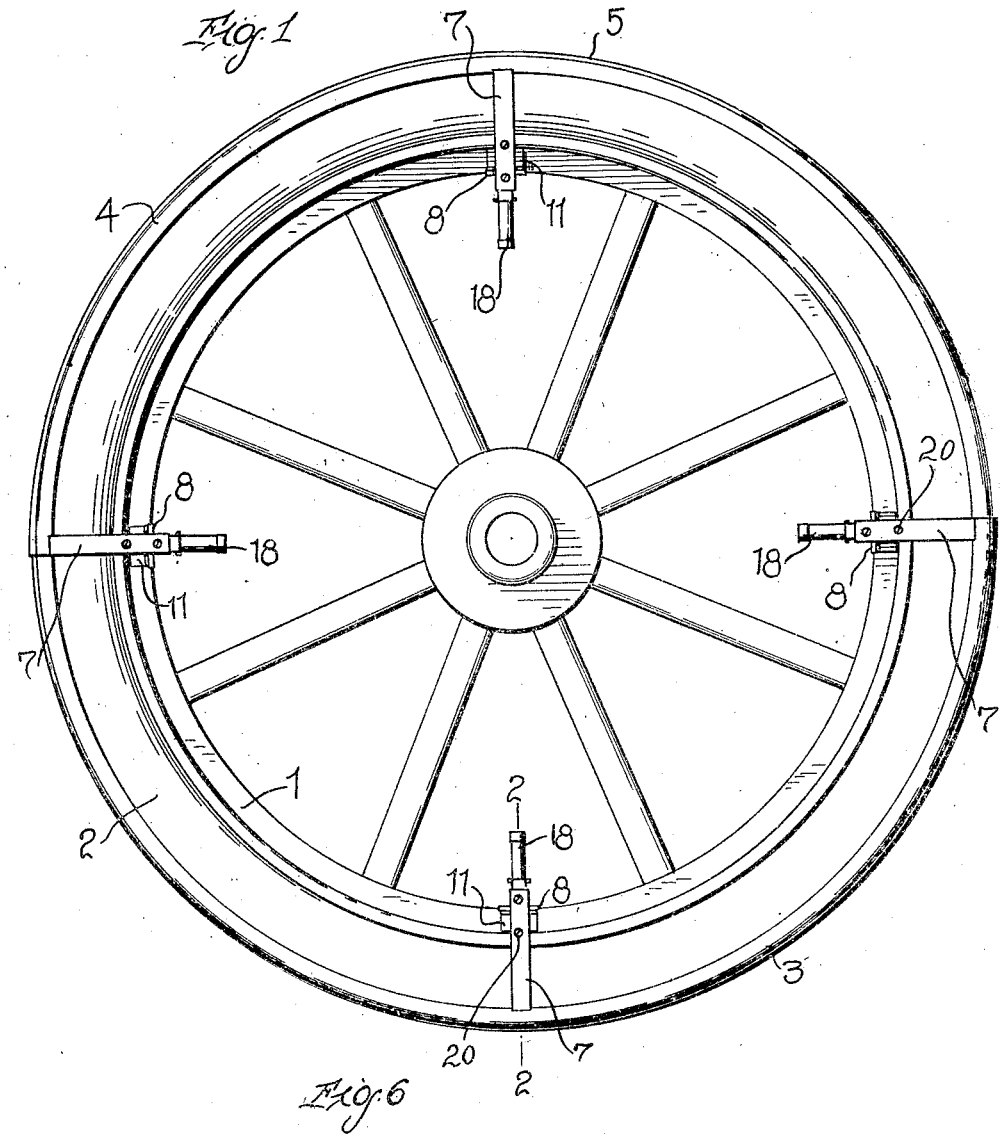

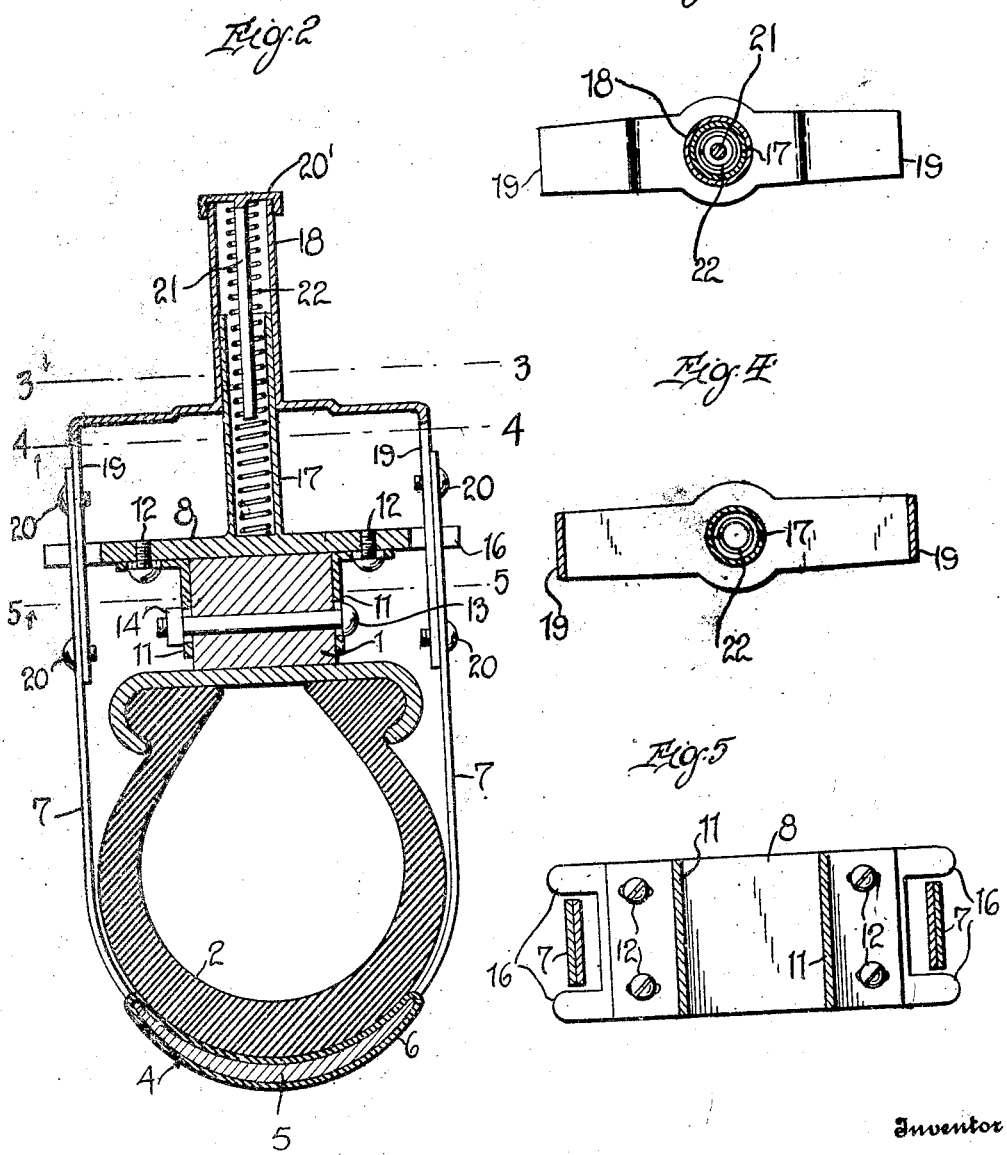

ALBERT S. LA HATTE, OF GALVESTON, TEXAS.

TIRE-PROTECTOR.

1,113,448.

Specification of Letters Patent.

Patented Oct. 13, 1914.

Application filed May 8, 1914. Serial No. 837,277.

*To all whom it may concern:*

Be it known that I, ALBERT S. LA HATTE, a citizen of the United States, residing at Galveston, in the county of Galveston and State of Texas, have invented certain new and useful Improvements in Tire-Protectors, of which the following is a specification, reference being had to the accompanying drawings.

This invention relates to new and useful improvements in pneumatic tire attachments and more particularly to a protecting device removably applied to the periphery of the tire, the main object of the present invention being the provision of a tire protecting device which is applicable to the pneumatic tire to protect the outer surface of the same and is so mounted as to co-act with the resiliency of the pneumatic tire.

Another object of the present invention is the provision of a tire protecting device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a tire protector constructed in accordance with my invention and illustrating the application of the same. Fig. 2 is an enlarged sectional view taken on the line 2—2, Fig. 1. Fig. 3 is a transverse sectional view taken on the line 3—3, Fig. 2. Fig. 4 is a transverse sectional view taken on the line 4—4, Fig. 2. Fig. 5 is a transverse sectional view taken on the line 5—5, Fig. 2, the felly being removed, and Fig. 6 is a transverse sectional view of the protecting casing.

Referring more particularly to the drawings, 1 indicates the rim of a vehicle wheel having mounted thereon a pneumatic tire 2. My improved protecting device includes semicircular metallic sections generally indicated by the numerals 3 and 4, each section being formed arcuate in cross section and tapering in form from the central portion thereof outwardly to each of its longitudinal edges. It will be apparent that each section of the protecting device is formed substantially arcuate so as to conform to the curvature of the tire in its inflated condition. Each of the sections 3 and 4 are provided with a covering 6 which extends entirely around the same and is to be formed of rubber, leather or other material, or the device may be in the form of a composition and it will be apparent that by applying this cover to the metallic tread sections, it will render them noiseless, when passing over paved streets, and also prevent the tire casing from being rubbed or chafed by the general movement of the sections.

Secured to one end of each of the sections and at the intermediate portion thereof, are the substantially U-shaped brackets 7, which extend inwardly and are disposed upon opposite sides of the rim 1, the ends of said brackets being secured to the rim of the wheel in a manner which will be presently set forth. Arranged upon the inner side of the rim 1, are the plates 8, said plates being of substantially heavy metallic construction and they are securely held in position by means of the angular plates 11 which are preferably adjustable with respect to the rim so that they may be readily applied to rims of various thicknesses. The horizontal portions of the brackets 11 are secured to the outwardly projecting ends of the plate 8, by means of the screw bolts 12.

The vertical portions of the plates 11 are adjustably secured to the rim by means of the transverse bolts 13 which extend through the wheel rim and the plates and are secured in position by means of the nuts 14. The ends of the plates 8 are bifurcated to form the spaced guide arms 16 which are adapted to be arranged upon opposite sides of the ends of the brackets 7 to prevent lateral movement of the same. Formed integral with the central portion of the plates 8 are the outwardly projecting tubes 17 and slidably mounted upon the outer ends thereof are the opposing tubes or casings 18 and formed integral with the inner ends of the tubes 18 are the angularly disposed arms 19, the ends of which are arranged in parallel relation with the ends of the U-shaped brackets 7, and secured thereto by means of the transverse bolts 20.

The tubes 18 are provided at their outer ends with the removable caps 20' and formed integral with said caps are the central core members or guide stems 21 upon which are mounted the coil springs 22, the one end of each of which bears against the caps of the brackets 18, while the other ends thereof engage the inner ends of the tubes 17, thus yieldably mounting the protecting sections, whereby they co-act with the resiliency of the pneumatic tire in moving toward or away from the wheel rim.

It will be apparent from the foregoing description, taken in connection with the accompanying drawings, that I have provided a simple and durable pneumatic tire protector which can be quickly and readily applied to the tire and is so mounted as to coact with the resiliency of the pneumatic tire itself and which, at the same time, will protect the tire against the usual wear upon the same and is provided with a suitable covering or casing whereby to prevent the rubbing or chafing of the protector upon the pneumatic tire. The protector, as herein shown and described, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention as defined by the appended claims.

Having thus described this invention, what I claim is:—

1. The combination with a wheel rim having a pneumatic tire secured thereto, of a protecting member applied to the periphery of the tire, U-shaped brackets carried by said protecting member and having their ends projecting upon opposite sides of the tire, a plate secured to the inner side of the felly of the wheel, bracing plates carried by the felly and having portions thereof secured to the plate, the outer ends of said plate being bifurcated to receive the projecting ends of the brackets, a tubular member carried by the first plate, a second tubular member movably mounted upon the first member, a coil spring arranged within said tubular brackets, a removable cover for the second tubular member having an inwardly projecting plunger arranged within the coil spring, and angularly disposed arms connected with the second tubular member, and having their ends connected to the projecting ends of the U-shaped brackets, and movable in the bifurcated ends of the first plate, as and for the purpose set forth.

2. The combination with a wheel rim having a pneumatic tire secured thereto; of a protecting member applied to the periphery of the tire, U-shaped brackets carried by said protecting member and having their ends projecting upon opposite sides of the tire, a plate arranged upon the inner side of the wheel rim, angular plates having their horizontal portions adjustably secured to said plate and their vertical portions adjustably secured to opposite sides of the wheel rim, a tubular member carried by the first plate, a second tubular member removably mounted upon the first member, a coil spring arranged within the same, a connecting plate carried by the second tube and having angularly disposed arms, and means for removably securing the same to the ends of the U-shaped brackets, as and for the purpose set forth.

In testimony whereof I hereunto affix my signature in the presence of two witnesses.

ALBERT S. LA HATTE.

Witnesses:
 ARTHUR HAY,
 E. C. LARKINS